United States Patent

Hayashi

[11] Patent Number: 6,155,814
[45] Date of Patent: *Dec. 5, 2000

[54] APPARATUS FOR CONTINUOUSLY AND UNIFORMLY SUPPLYING DOUGH

[75] Inventor: Torahiko Hayashi, Utsunomiya, Japan

[73] Assignee: Rheon Automatic Machinery Co. Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/651,107

[22] Filed: May 21, 1996

[30] Foreign Application Priority Data

May 22, 1995 [JP] Japan ................................. 7-148207
Oct. 25, 1995 [JP] Japan ................................. 7-301942

[51] Int. Cl.⁷ ........................................ A21C 3/02
[52] U.S. Cl. ........................ 425/363; 425/367; 426/502
[58] Field of Search ................... 425/363, 365, 425/367, 372, 145, 194; 426/502, 516, 517

[56] References Cited

U.S. PATENT DOCUMENTS

| | | | |
|---|---|---|---|
| 3,553,775 | 1/1971 | Decker | 425/363 |
| 4,276,317 | 6/1981 | Hayashi | 426/501 |
| 4,338,341 | 7/1982 | Glass | 426/231 |
| 4,375,349 | 3/1983 | Vrbanek | 425/324.1 |
| 4,869,661 | 9/1989 | Nogueroles . | |
| 4,904,491 | 2/1990 | Morikawa et al. . | |
| 4,946,699 | 8/1990 | Kageyama et al. . | |
| 5,091,202 | 2/1992 | Hayashi . | |
| 5,110,277 | 5/1992 | Hayashi | 425/141 |
| 5,124,163 | 6/1992 | Hayashi | 426/231 |
| 5,204,123 | 4/1993 | Hayashi | 425/141 |
| 5,225,209 | 7/1993 | Hayashi | 425/145 |
| 5,232,713 | 8/1993 | Morikawa et al. . | |
| 5,266,341 | 11/1993 | Morikawa et al. | 426/231 |
| 5,498,148 | 3/1996 | Ouellette et al. | 425/294 |
| 5,505,970 | 4/1996 | Morikawa . | |
| 5,733,589 | 3/1998 | Oki . | |
| 5,888,573 | 3/1999 | Hayashi . | |

FOREIGN PATENT DOCUMENTS

| | | |
|---|---|---|
| 687310 | 5/1996 | Australia . |
| 0 140 458 | 5/1985 | European Pat. Off. . |
| 0 251 138 A1 | 1/1988 | European Pat. Off. . |
| 0 326 404 | 1/1989 | European Pat. Off. . |
| 0 311 240 | 4/1989 | European Pat. Off. . |
| 453 248 | 10/1991 | European Pat. Off. . |
| 0 545 725 | 6/1993 | European Pat. Off. . |
| 0 657 101 | 12/1994 | European Pat. Off. . |
| 0 744 126 | 5/1996 | European Pat. Off. . |
| 44 24 461 A1 | 7/1994 | Germany . |
| 60-184345 | 9/1985 | Japan . |
| 61-6782 | 2/1986 | Japan . |
| 5-3253 | 1/1993 | Japan . |
| 6-37 | 1/1994 | Japan . |
| 2121723 | 6/1995 | Russian Federation . |

*Primary Examiner*—James P. Mackey
*Attorney, Agent, or Firm*—Brinks Hofer Gilson & Lione

[57] ABSTRACT

An apparatus including oppositely positioned rollers located at the bottom of a hopper containing dough. A gap between the rollers is periodically increased and decreased to avoid any concentrated stress in the dough and to facilitate the production of a continuous uniform sheet of dough. Alternatively, a plurality of pairs of oppositely and horizontally positioned rollers are mounted on pivoting or swinging arms located at the bottom of a dough-feeding hopper.

6 Claims, 10 Drawing Sheets

APPARATUS FOR CONTINUOUSLY AND UNIFORMLY SUPPLYING DOUGH

BACKGROUND OF INVENTION

1. Field of Invention

This invention relates to a method and an apparatus for continuously and uniformly supplying highly viscous and elastic dough through a narrow space at the bottom of a hopper during a bread-making process.

2. Prior Art

Dough is a fluid material with a high viscosity and elasticity due to its gel structure. This high viscosity causes a dough mass to resist stretching into a sheet by uniform and continuous feeding from a hopper through a narrow space between opposing rotating rollers.

A conventional apparatus which may be used to form a dough sheet using opposing horizontal rollers is disclosed in Japanese Patent Publication Nos. 5-3253 and 6-37. Dough is continuously fed between the rollers, which press the dough to form a sheet having a constant thickness and width. However, this conventional apparatus cannot make a thin sheet of dough. Also, this conventional apparatus does not completely prevent the loss of elasticity of the dough.

Figure 1:
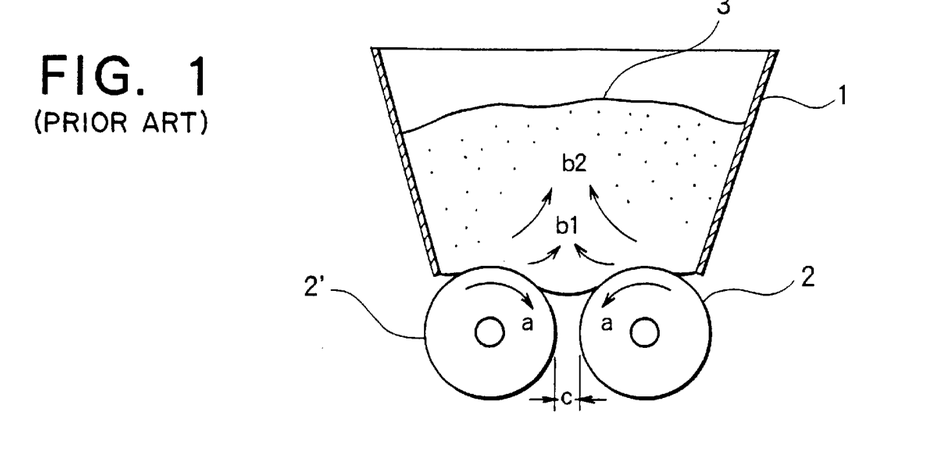
FIG. 1 is a sectional side view showing a conventional apparatus.

FIG. 1 illustrates a conventional apparatus. This conventional apparatus includes a hopper 1 which stores a dough mass 3. Rollers 2 and 2' are positioned below a bottom opening of the hopper. The rollers 2 and 2' are fixedly positioned opposite to each other and such that a fixed gap c is formed where the rollers 2 and 2' face each other.

The conventional apparatus cannot be used to form a sheet of high viscosity dough for the following reasons. A study revealed that, as illustrated in FIG. 1, when the rollers 2 and 2' are rotated in the direction of arrows a, the dough 3 in the hopper 1 flows in the directions of arrows b1 and b2 (that is, upward away from the gap c). This phenomenon is caused by stresses in the dough 3 which are located at and above the gap c. As the rollers 2 and 2' rotate in the directions of arrows a to push the dough 3 in opposite directions toward the gap c, the two flows collide with each other, and then flow together in the directions of arrows b1 and b2 (that is, away from the gap c between the rollers 2 and 2'). The reason why the dough 3 flows away from the gap c is that the amount of stress in the dough 3 adjacent the gap c is higher than that at an upper portion of the dough 3. Thus, it is difficult for the dough to flow toward the gap c between the rollers 2 and 2'.

In an alternative conventional method, in order to uniformly and continuously produce a sheet of dough, dough portions are separated from a dough mass prior to pressing between a pair of rollers. In particular, a piston and a cylinder are provided at the bottom of the hopper. A predetermined amount of dough mass is drawn by the piston into the cylinder, then the dough portion is separated (cut) from the remainder of the dough mass, and, finally, the separated dough portion is extruded by the piston from the cylinder such that it passes between a pair of opposing rollers. These steps are repeated such that a continuous dough sheet is produced by the rollers.

Several problems are associated with the above-mentioned conventional method. First, the piston and cylinder mechanism, along with the associated separating process, is complex. Further, the process steps repeatedly exert a shearing stress on the dough, thereby causing the dough to lose elasticity. Thus, a resting step is needed after the sheet is formed, and a chemical additive such as potassium bromide is typically used to allow the elasticity to recover before bread is made from the dough sheet.

SUMMARY OF INVENTION

The present invention overcomes the disadvantages of the conventional apparatus by applying a variable pressing force to the dough using a pair of rotating pressing members such that a stress at a gap between the members is periodically lower than that at an upper position of the dough, thereby allowing the dough to be reliably fed out through the gap between the members.

In addition, the present invention overcomes the disadvantages of the conventional method which requires a complex apparatus, additives, and an additional step for recovering the elasticity of dough.

In accordance with a first aspect of the present invention, an apparatus is provided which includes oppositely positioned rollers (pressing members) located below a hopper containing a dough mass. Dough fed from the hopper passes between the rollers to produce a uniform and continuous dough sheet. Unlike the conventional apparatus, the gap between the rollers is periodically changed to avoid any concentrated stress in the dough. This allows highly viscous dough to be constantly and stably fed through the gap between the rollers. As a result, the successive steps for making bread are simplified because a recovery step is avoided, and additives are not required.

In accordance with another aspect of the present invention, a method is provided which includes continuously supplying a dough mass from, for example, a hopper such that the dough mass is directed onto a pair of horizontally positioned rollers. The rollers are rotated in opposite directions such that a lower-most surface of the dough mass (that is, the portion of the dough mass contacting the upwardly-facing surfaces of the rollers) are moved toward the gap. In addition, a width of the gap is continuously and repeatedly increased and decreased such that pressures applied to the dough mass by the rollers is continuously changed, thereby allowing the dough to pass between the rollers and to be discharged as a uniform sheet of dough from a bottom of the gap.

In accordance with another aspect of the present invention, an apparatus and method are provided in which a plurality of pairs of rollers (or two conveyors) are positioned below the bottom opening of a hopper such that a dough mass is fed between the pairs of rollers. The pairs of rollers are arranged vertically such that a first pair of rollers is positioned above a second pair of rollers. Each pair of rollers rotates in opposite directions and is moved to repeatedly apply pressure to the dough mass. In addition, the pairs of rollers are arranged such that the distances between the rollers of each pair gradually decreases from the uppermost pair to the lowermost pair.

In accordance with another aspect of the invention, the single pair (or plurality of pairs) of oppositely and horizontally positioned rollers are provided in association with a pressing mechanism for moving at least one of the rollers of each pair toward and away from the other roller. The rollers either reciprocate along a linear path, or reciprocally swing (pivot). These reciprocating motions increase and decrease the width of the gap between the opposing rollers to apply and remove the pressure from the dough, thereby preventing the inner stress of the dough from increasing such that the elasticity of the dough is damaged, and thereby allowing continuous production of a sheet (web) of dough having a predetermined thickness.

DESCRIPTION OF THE PREFERRED EMBODIMENT

Figure 2:
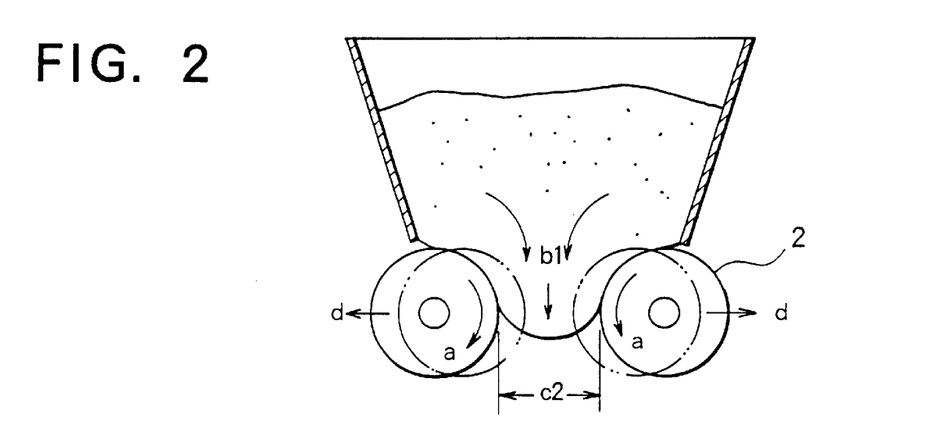
FIGS. 2 and 3 are sectional side views illustrating operating positions of an apparatus in accordance with a first embodiment of the present invention.
Figure 3:
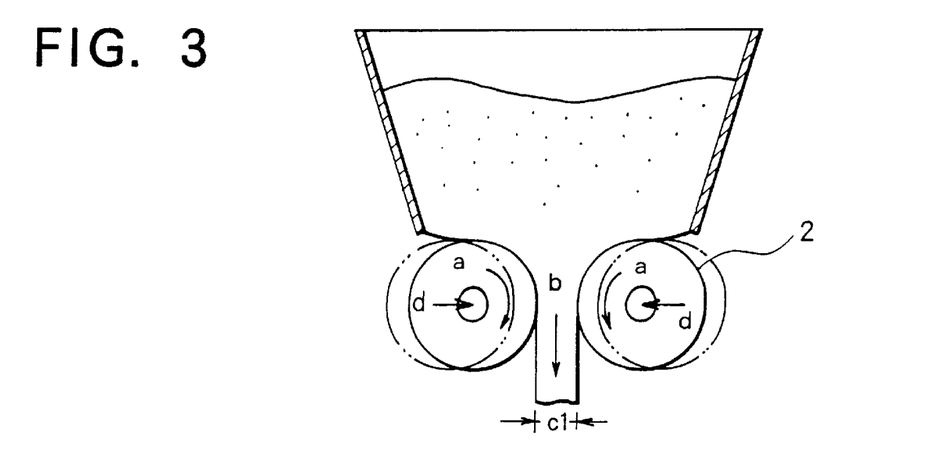

FIGS. 2 and 3 show a method and apparatus for producing a sheet of dough in accordance with a first embodiment of the present invention.

In accordance with the first embodiment, first and second rollers (conveying members) 2 and 2' are provided below a bottom opening of a hopper 1. Unlike the conventional apparatus of FIG. 1, however, the rollers 2 and 2' are moved by a suitable mechanism (not shown) toward and away from each other such that the gap between the rollers 2 and 2' periodically increases and decreases between a maximum gap distance c2 (FIG. 2) and a minimum (original) gap distance c1 (FIG. 3). This process alternates the pressures applied to the dough 3 due to the periodic widening of the gap c between the opposite rollers 2 and 2'. The arrows d in FIG. 2 show the directions of the rollers when they move outwardly. When the gap is widened to the gap distance c2, as shown in FIG. 2, the stress at the position b1 in the dough decreases. As a result, the dough 3 flows toward the gap c2, and the oppositely rotating surfaces of the rollers 2 and 2' draw the dough 3 in the directions of the arrows a by the friction between the surface of each roller 2 and 2' and the dough 3. Therefore, when the stress at the position b1 decreases, the dough 3 is drawn by the surfaces of the rollers 2 and 2', so that the dough 3 flows in the directions of the arrows a, and flows through the gap c, as shown in FIG. 3.

Then, the rollers 2 and 2' move toward each other to form the narrow gap distance c1. As the rollers 2 and 2' move together, the dough 3 is pressed between the rollers 2 and 2', thereby causing the friction between the surfaces of the rollers and the dough to increase. As shown by the arrow b in FIG. 3, further rotation of the rollers 2 and 2' in the direction of the arrows a causes the dough 3 to discharge downward from the gap c1. That is, when the wide gap distance c2 is narrowed to the narrow gap distance c1, friction between the surfaces of the rollers and the dough 3 can be increased, so that the dough can be continuously discharged through the gap. By repeating the movement of the rollers a stable and continuous discharge of the dough can be achieved.

A study on the discharge of the dough found that the discharge rate of the dough in FIG. 3 was substantially the same as the circumferential speed of the rollers 2 and 2'. The widening and narrowing of the gap did not cause any change in the size (thickness) of the material when it was discharged through the gap.

Figure 4:
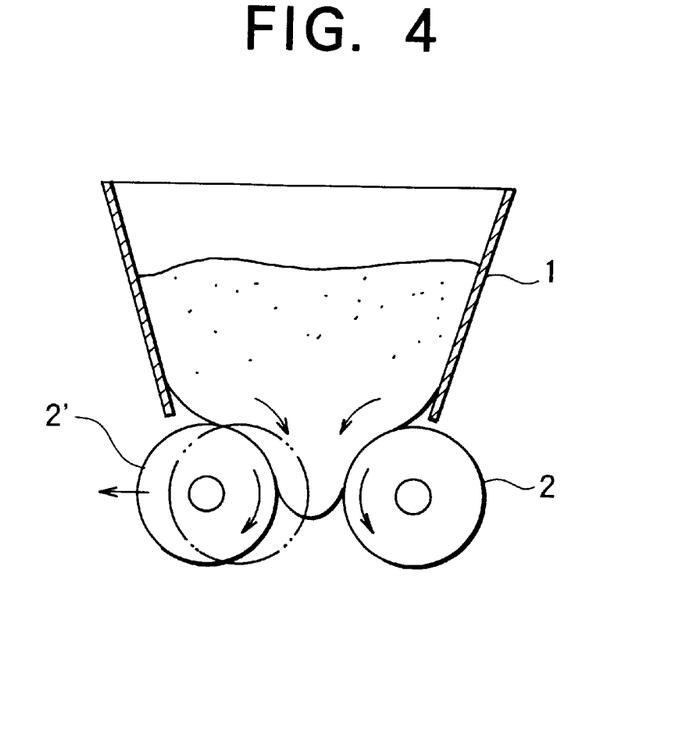
FIGS. 4 and 5 are sectional side views showing alternative pressing operations in accordance with a first embodiment of the present invention.
Figure 5:
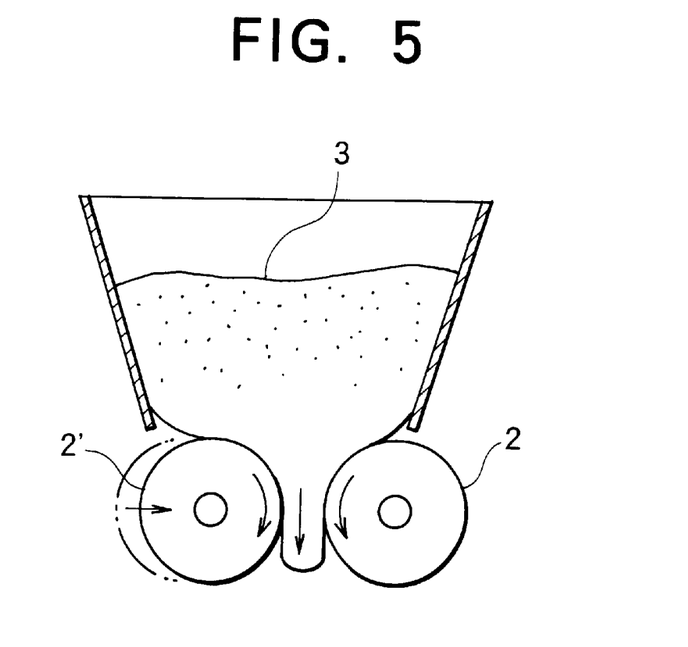

In the first embodiment of this invention, the rollers 2 and 2', which are arranged opposite each other, linearly reciprocate when the gap c is widened and narrowed to press the dough 3. In an alternative embodiment, one roller may be fixed while the other roller reciprocates. For example, as shown in FIGS. 4 and 5, the roller 2 is fixed at a predetermined position, and the roller 2' reciprocates relative to the fixed roller 2.

Figure 6:
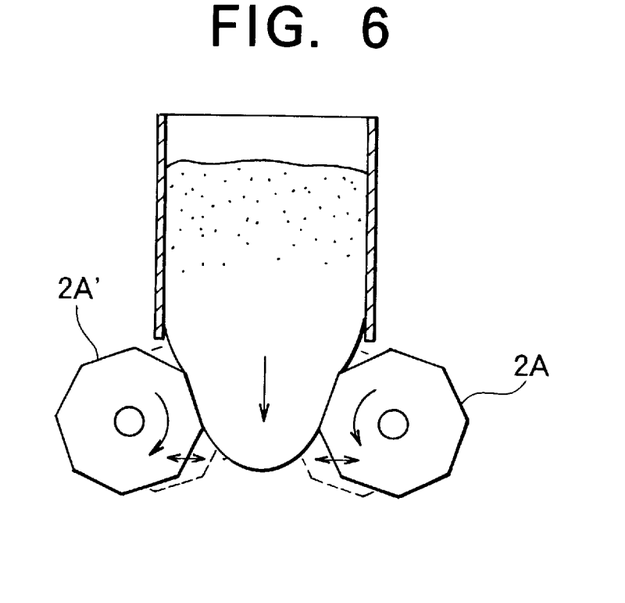
FIGS. 6 and 7 are sectional side views showing alternative pressing members for use in the first embodiment.
Figure 7:
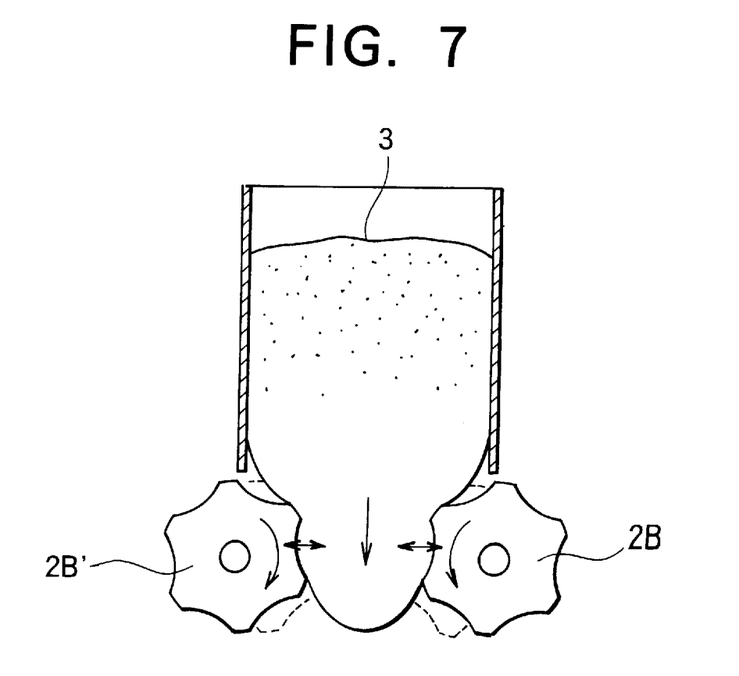

In addition, the circular rollers 2 and 2' may be replaced which conveying members having non-circular cross-sectional shapes. For example, the rollers may have a polygonal cross-sectional shape (see rollers 2A and 2A' in FIG. 6), polygonal with rounded corners (not shown), or with concave or convex portions (see rollers 2B and 2B' in FIG. 7).

As stated above, in the first embodiment one or more of the rollers 2 and 2' reciprocates linearly with respect to the other roller. In an alternative embodiment, the rollers may reciprocate along non-linear paths, such as when the rollers are mounted on swinging arms which widen or narrow a gap c through which dough is discharged (not shown). These rollers can generate effects similar to those of the rollers 2 and 2'.

Figure 8:
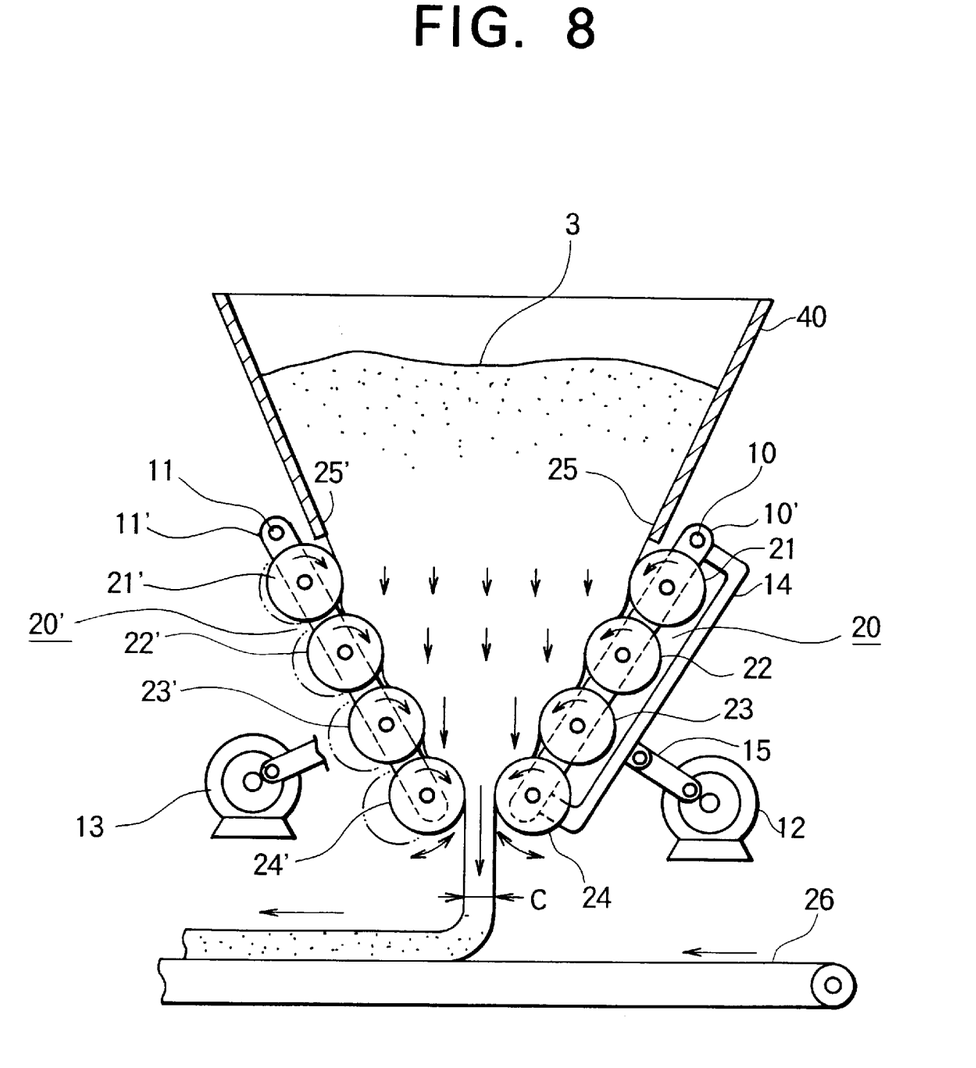
FIG. 8 is a sectional side view showing a second embodiment of the present invention.

FIG. 8 shows a second embodiment of the present invention which provides additional advantages over the first embodiment. Elements similar to those of the first embodiment are denoted by the same reference numbers.

In accordance with the second embodiment, a first group of pressing rollers 21, 22, 23 and 24 are arranged opposite to a second group of pressing rollers 21', 22', 23' and 24'. Each of these rollers is rotated by a driving mechanism (not shown). The circumferential speeds of the lower rollers of the first and second groups are faster than those of the upper rollers of the first and second groups. For example, rollers 24 and 24' are rotated faster than rollers 23 and 23', which in turn are rotated faster than rollers 22 and 22'. This causes in the dough 3 to be effectively moved downwards and formed as a sheet of dough. This sheet of dough is then transferred by a conveyor 26 to the successive steps.

The rollers 21, 22, 23 and 24 are rotatably mounted on an arm 10' to form a group 20. The arm 10' is pivotable around a shaft 10. Similarly, the rollers 21', 22', 23,' and 24' are rotatably mounted on an arm 11' to form a group 20'. The arm 11' is pivotable around a shaft 11. The rollers of the group 20 are reciprocated toward and away from the rollers of the group 20' by pivoting of the arm 10', which is pivoted by means of a motor 12 through a swinging bar 14 and a crank 15. The rollers group 20' is similarly reciprocated by means of a motor 13 through a swinging bar and a crank (not shown).

The arms 10' and 11' are arranged in a "V" shape with the wide end of the "VI" being positioned below the lower opening formed by the opposing walls 25 and 25' of a hopper 40, as shown in FIG. 8. That is, a horizontal spacing between the uppermost pair of rollers 21 and 21' is wider than the spacing between the lowermost pair of rollers 24 and 24'. A gap C is formed between the lowermost pair of rollers 24 and 24' through which the dough 3 is discharged. The size (horizontal distance) of the gap C is changed when the rollers 21, 22, 23 and 24 and the rollers 21', 22', 23' and 24' are pivoted by the motors 12 and 13 to move from or approach each other. The range and rate of the pivoting movement of the arms 10' and 11' are controlled by the motors 12 and 13.

In accordance with the second embodiment, the stress in the dough near the gap C is prevented from increasing to an undesirable level by repeatedly increasing and decreasing the distances between the opposite rollers by pivoting the arms 10' and 11', thereby causing the dough to be stably discharged through the gap C.

In accordance with the second embodiment, the "VI" shape arrangement of a plurality of pairs of rollers allows a compression ratio applied to the dough to be greater than in the first embodiment, where one pair of rollers is used. Thus, the arrangement of the second embodiment allows the discharge rate of the dough to be greater than that of the first embodiment. When the dough is discharged through the gap, its discharge speed is the same as the circumferential speed of the lowest pair of rollers 24 and 24'.

Figure 9:
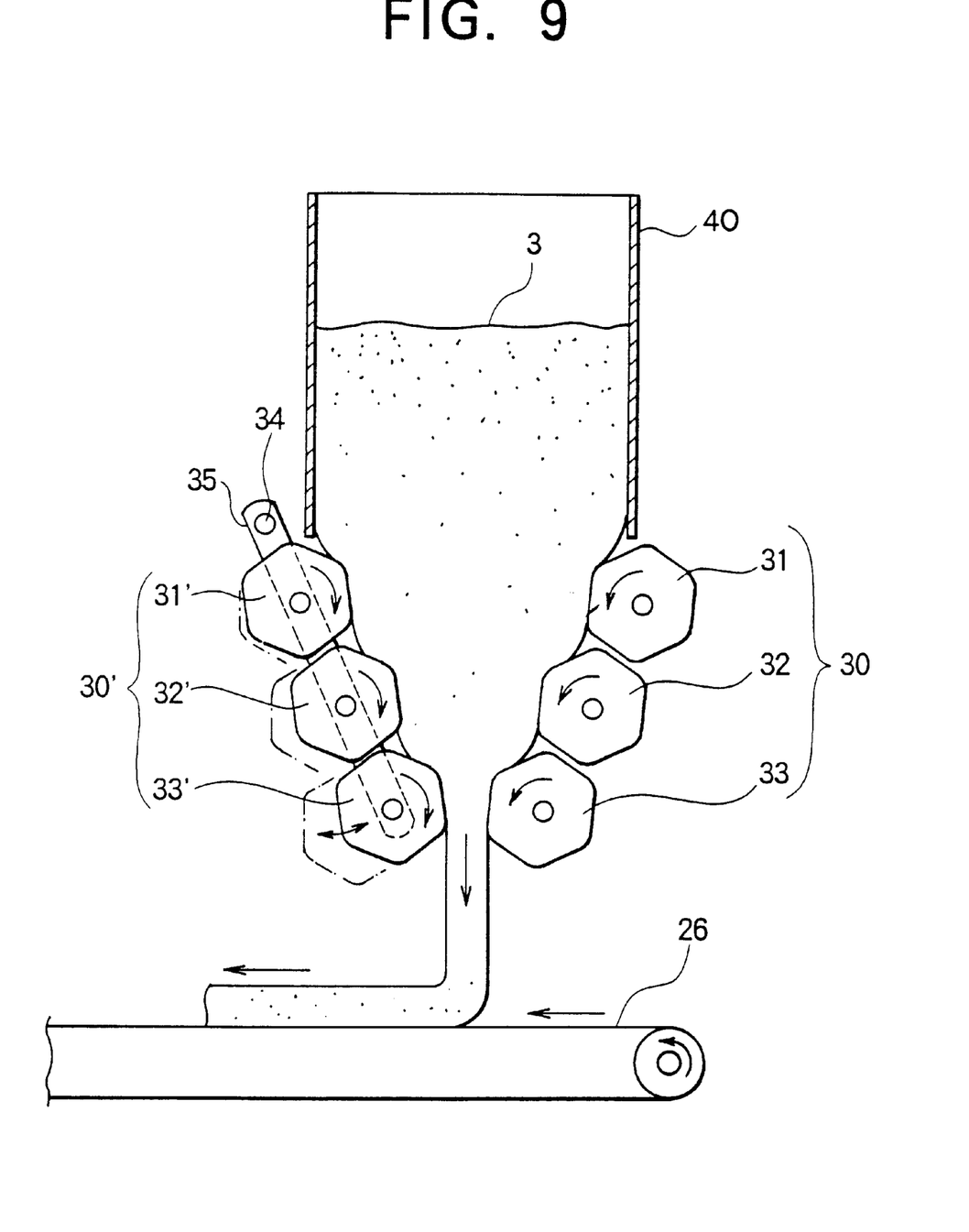
FIG. 9 is a sectional side view showing a third embodiment of the present invention.

FIG. 9 shows a third embodiment of the present invention. Elements of the third embodiment that are similar to those of the second embodiment are denoted by the same reference numbers.

In the second embodiment, the groups 20 and 20' of rollers are arranged in a "V" shape and are positioned adjacent the lower outlet of the hopper 40. The distances between the opposite rollers are repeatedly widened and narrowed by movement of the arms 10' and 11'. However, this invention is not limited to that arrangement. For example, in accordance with the third embodiment, as shown in FIG. 9, only one group of rollers is pivoted to widen and narrow the distances between the respective rollers. That is, a pair of groups of rollers 30 and 30' is arranged in a "V" shape and is positioned below the hopper 40'. The group of rollers 30 is fixed at a predetermined position, while the group of rollers 30' are mounted on an arm 35 which is pivoted around a shaft 34. That is, to repeatedly increase and decrease the distances between the opposing groups of rollers, it is unnecessary to move both the groups 30 and 30'. The rotating speed of each roller in the group 30 can be controlled. The cross-sectional shape of each roller is hexagonal, but has rounded corners. The group 30 includes three rollers 31, 32 and 33, and the group 30' includes rollers 31', 32' and 33'. By this arrangement, the dough 3 is moved by the rotation of the rollers, while the group of rollers 30' is swung to repeatedly widen and narrow their gaps, so that a sheet of dough that has a predetermined thickness is discharged through the gap separating the lowermost pair of rollers 33 and 33'.

In the third embodiment, the hexagonal rollers with rounded corners allow an increase in the friction applied to the dough 3, thereby increasing the discharging force applied to the dough by the rollers.

The force applied to the dough by frictional contact with the rollers can be changed by changing the shape of the rollers, the rotating speed of each roller, or the ratio of the rotating speed of the uppermost pair of rollers relative to that of the lowermost pair of rollers. These operating conditions are appropriately selected according to parameters such as the characteristics of the dough 3 and the amount of discharged dough.

Figure 10:
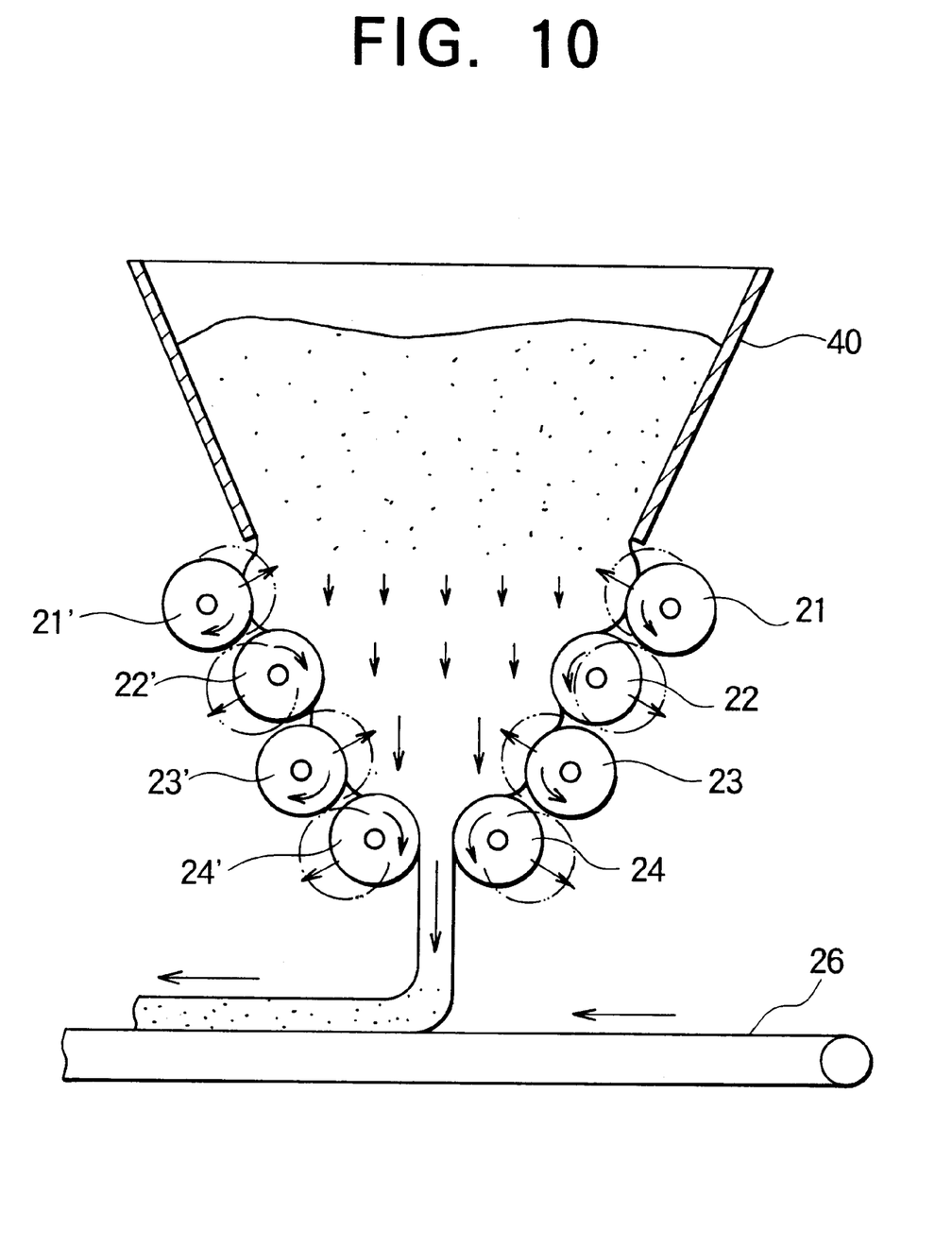
FIG. 10 is a sectional side view showing a fourth embodiment of the present invention.
Figure 11:
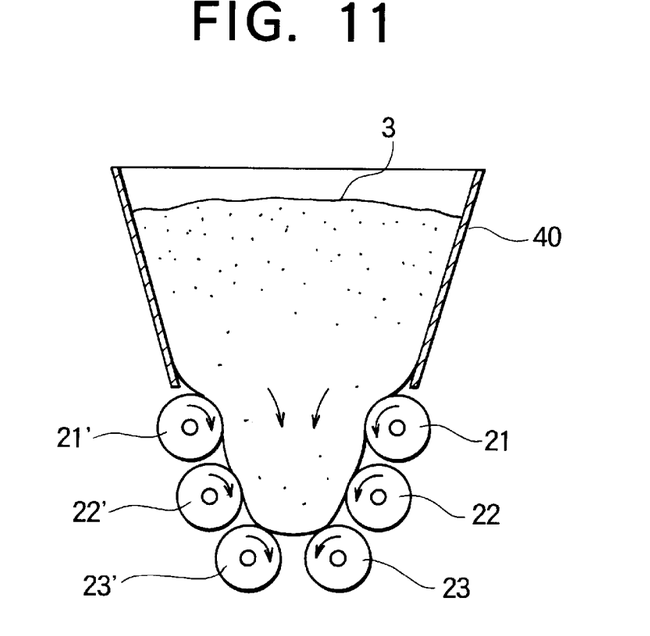
FIGS. 11–14 are sectional side views illustrating a fifth embodiment of the present invention.

FIG. 10 shows a fourth embodiment of the present invention. Elements of the fourth embodiment that are similar to those of the third embodiment are denoted by the same reference numbers.

As stated above, in the second and third embodiments, the rollers are mounted on arms. That is, the rollers in each group are linearly aligned on the arm. Thus, the rollers in one group are jointly pivoted to move away from or move toward the corresponding rollers of the other group. In the fourth embodiment, as shown in FIG. 10, the rollers 21 through 24 and 21' through 24' are not mounted on arms, thereby allowing each of the rollers to be moved independently of adjacent rollers. Thus, each opposing pair of rollers is moved away from or toward each other independently of the other pairs, so that adjacent pairs of rollers can be moved in opposite directions. This arrangement allows the distances between the opposing rollers to be increased and decreased, so that the adjacent pairs of rollers alternately move in two directions. For example, when the pair of rollers 21 and 21' is move toward each other, the adjacent pair of rollers 22 and 22' moves away from each other. As a result, pressure is applied to or removed from the dough at different levels while the rollers rotate in directions to urge the dough downwards, so that the dough can be discharged more effectively.

Figure 12:
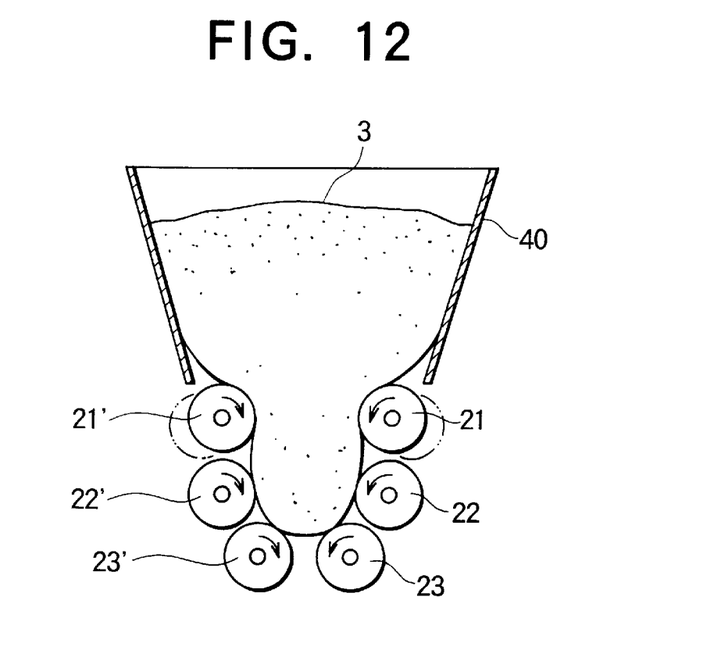
Figure 13:
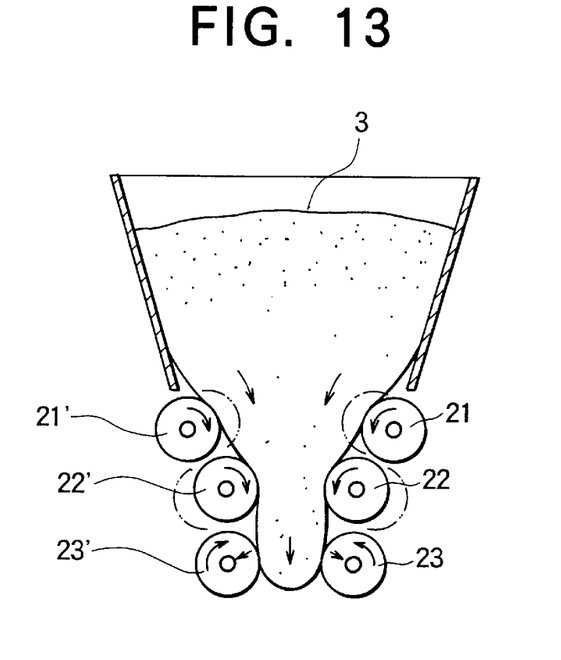
Figure 14:
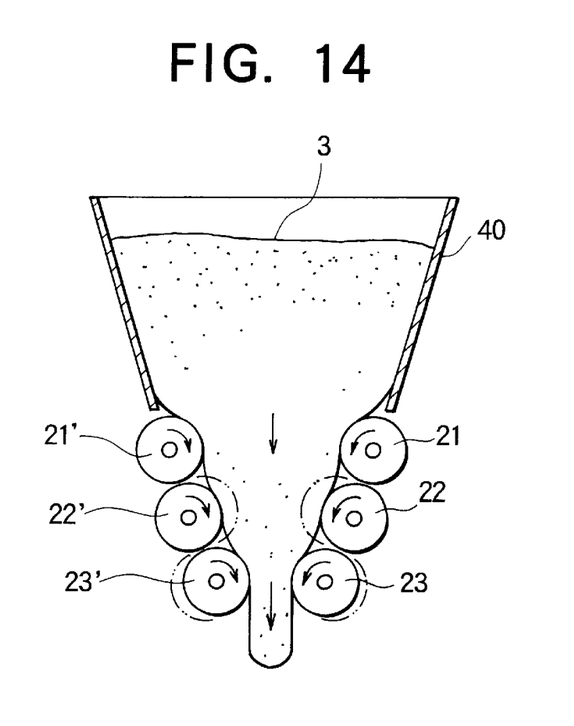

FIGS. 11–14 show a fifth embodiment of the present invention. In the fifth embodiment, the rollers jointly pull down and press the dough 3, so that the dough is smoothly fed downward through the gap located between the lowermost pair of rollers 23 and 23'. That is, first the pair of rollers 21 and 21' are moved to approach each other, as shown in FIG. 12. Next, the rollers 21 and 21' are moved away from each other and, at the same time, the rollers 22 and 22' are moved toward each other, as shown in FIG. 13. Subsequently, the pair of rollers 22 and 22' are moved away from each other while the pair of rollers 23 and 23' are moved toward each other, as shown in FIG. 14. As a result, the movement of the pairs of rollers is coordinated such that a portion of the dough is pressed from the uppermost pair to the next lower pair. By this arrangement, the pressed portion in the dough moves from an upper pair to next lower pair, so that a feeding rate of the dough is effectively increased. Additionally, the frictional force applied by the surfaces of the rollers to the dough is continuously applied, so that the dough is effectively pushed by the rollers and then discharged through the gap between the lowermost pair of rollers 23 and 23'.

Figure 15:
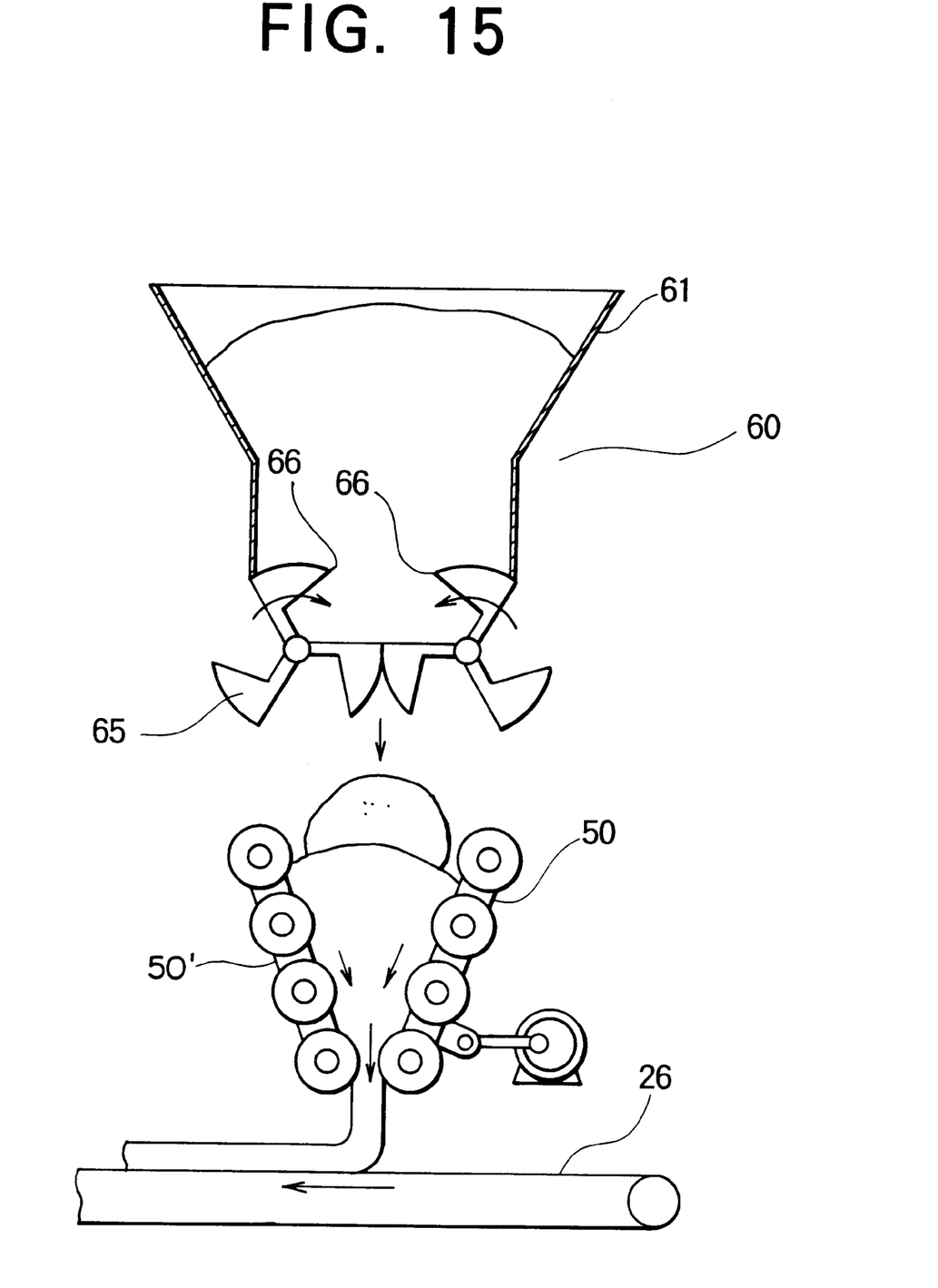
FIG. 15 is a sectional side view showing a sixth embodiment of the present invention.

FIG. 15 shows a sixth embodiment of the present invention. While a group 50' of rollers are fixed, another group 50 of rollers are pivoted by a motor to widen and narrow the distances between the groups of the rollers. The rollers are arranged such that a roller in one group corresponds to a roller in another group forming a pair of rollers arranged on the same height (vertical) level. A dough-supplying apparatus 60 is located above the rollers. The dough supplying apparatus 60 includes a hopper 61 and a pair of cutters 65. The cutters 65 are oppositely positioned at the bottom opening of the hopper 61, and are driven to rotate by a mechanism (not shown). A knife portion including one or more knives is provided at the end of each cutter 65. When the cutters are rotated, pieces of the dough in the hopper 61 are cut and then fall onto a dough that has previously been supplied between the groups of rollers 50 and 50'. The dough is then discharged through the gap between the lowermost pair of rollers to form a sheet of dough. The dough sheet is then conveyed by the conveyor 26 to subsequent processing stations.

Figure 16:
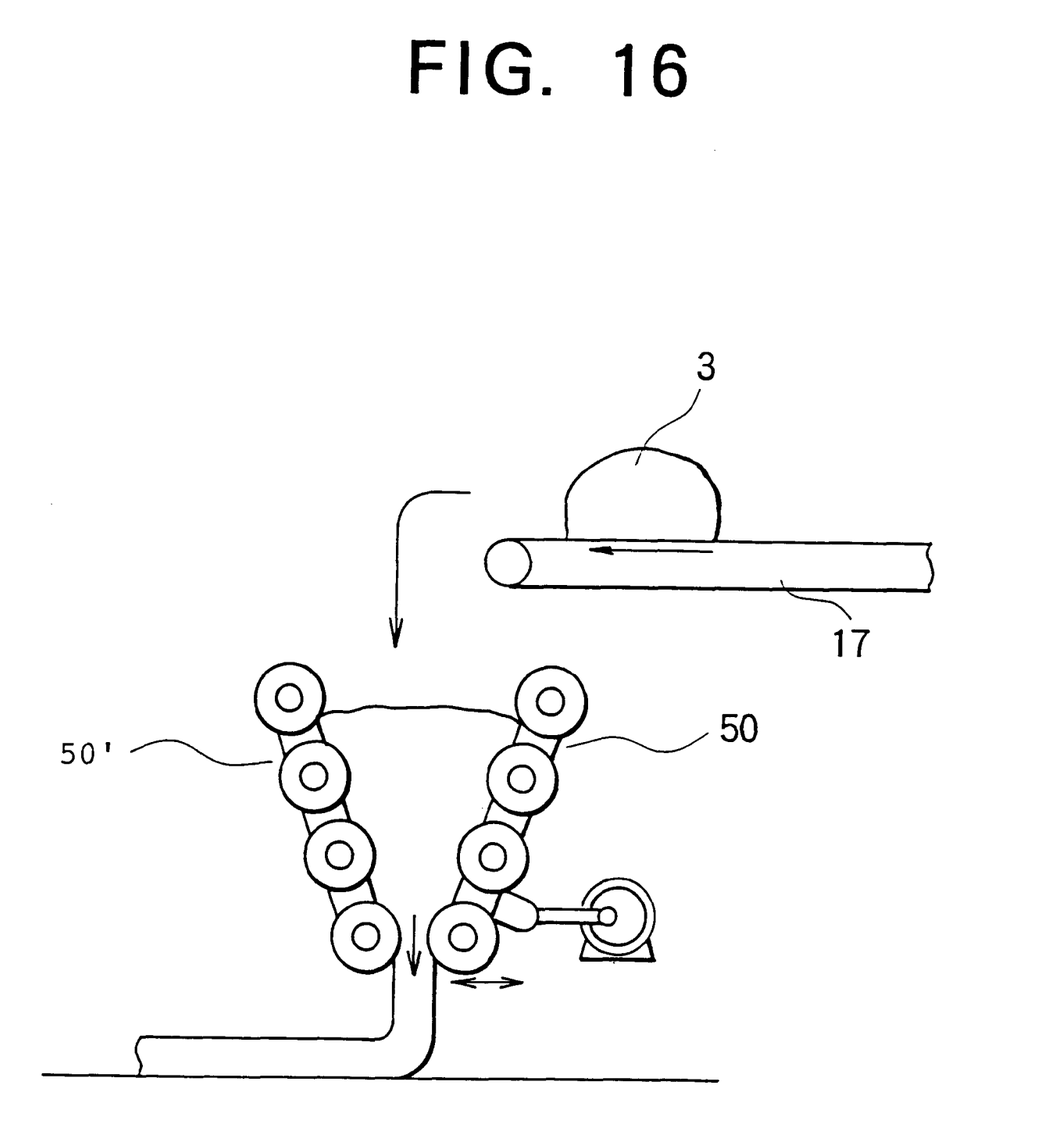
FIG. 16 is a sectional side view showing a seventh embodiment of the present invention.

FIG. 16 shows a seventh embodiment of the present invention. Unlike the previously-described embodiments, the seventh embodiment does not include a hopper located above the groups of rollers 50 and 50'. Instead, a conveyor 17 feeds masses of dough 3 to a position between the pair of groups of rollers 50 and 50'.

In the foregoing embodiments of the present invention, a pair of rollers or several pairs of rollers are used to discharge the dough therebetween. However, a pair of conveyors (pressing members) or several pairs of conveyors may be used instead of the rollers. For example, each of the groups of rollers 20 and 20' in FIG. 8 may be replaced by a plurality of conveyors, e.g., two or three conveyors.

As described above with respect to the second and third embodiments, the groups of rollers are arranged in "V" shaped groups, and the rotating speeds of the rollers gradually increases in the direction from the uppermost to the lowermost rollers. However, the present invention is not limited to this arrangement. The difference between the rotating speeds of the rollers can be determined based on conditions such as the dough material. In addition, the above embodiments include rollers which are shown as always rotated. However, the rollers can be intermittently rotated in response to the widening and narrowing of the distances between the pairs of rollers.

As stated above, the present invention provides a method for providing a pair of rollers (pressing members) that are rotatable in opposite directions and that are positioned at the bottom opening of a hopper, and pressing dough between the opposite rollers, wherein a distance between the rollers is repeatedly increased and decreased, whereby the stress in the dough is prevented from being increased.

Alternatively, horizontally positioned pairs of opposing rollers are arranged in vertical rows. The distance between the respective opposing pairs of rollers is periodically changed. By this arrangement the dough can be discharged more stably.

A roller whose cross section is polygonal can be used instead of one whose cross section is circular, so that the ability to discharge the dough increases. In the pairs of the rollers the distance between a horizontal pair of opposite rollers can be increased and decreased alternately while an adjacent pair of opposite rollers are moved in reverse directions. The distance between the opposite rollers can be changed such that the narrow gap between the opposite rollers is moved from the upper pair of rollers to the lower pair of rollers. As a result, the stress in the dough can be prevented, so that the dough can be discharged through the gaps stably.

I claim:

1. An apparatus for producing a continuous and uniform sheet of dough from a dough mass, the apparatus comprising:

first and second horizontally positioned pressing members separated by a gap; and means for rotating the first and second pressing members in opposite directions such that portions of the dough mass contacting upwardly-facing surfaces of the first and second pressing members are moved toward the gap;

means for sequentially increasing and decreasing a width of the gap between the first and second pressing members in a repetitive manner such that a stress within the dough mass is prevented from increasing, thereby allowing the dough mass to be discharged through the gap and for providing the continuous production of a sheet of dough having a uniform thickness.

2. The apparatus of claim 1 wherein at least one of the first and second pressing members is a roller having a circular cross section, and wherein the apparatus further comprises means for reciprocating the roller such that the gap is repeatedly increased and decreased.

3. The apparatus of claim 1 wherein the first and second pressing members respectively comprise first and second rollers, and said apparatus further comprises third and fourth rollers defining a second gap, the third roller being mounted above the first roller and the fourth roller being mounted above the second roller, wherein the second gap is larger than the gap between the first and second rollers.

4. The apparatus of claim 3 wherein the first and third rollers are mounted on a first arm and the second and fourth rollers are mounted on a second arm, and wherein the first and second arms are respectively pivoted around first and second shafts such that a width of the second gap and the width of the gap between the first and second pressing members are continuously and repeatedly increased and decreased.

5. The apparatus of claim 1 wherein the apparatus further comprises a hopper having an opening at a bottom thereof which is positioned over the horizontally positioned first and second pressing members.

6. The apparatus of claim 1 wherein the first and second pressing members are rotatably mounted on first and second arms, and the width of the gap is continuously and repeatedly increased and decreased by pivoting the first and second arms.

* * * * *